(12) United States Patent
Hauleitner et al.

(10) Patent No.: US 11,835,089 B2
(45) Date of Patent: Dec. 5, 2023

(54) BEARING ASSEMBLY

(71) Applicant: Aktiebolaget SKF, Gothenburg (SE)

(72) Inventors: Rudolf Hauleitner, Steyr (AT); Mohamed Sherif, Hilversum (NL)

(73) Assignee: Aktiebolaget SKF, Gothenburg (SE)

( * ) Notice: Subject to any disclaimer, the term of this patent is extended or adjusted under 35 U.S.C. 154(b) by 43 days.

(21) Appl. No.: 17/366,158

(22) Filed: Jul. 2, 2021

(65) Prior Publication Data

US 2022/0018394 A1 Jan. 20, 2022

(30) Foreign Application Priority Data

Jul. 17, 2020 (DE) .................. 102020208972.8

(51) Int. Cl.
| | |
|---|---|
| *F16C 33/10* | (2006.01) |
| *F16C 17/02* | (2006.01) |
| *C22C 38/00* | (2006.01) |
| *C21D 9/40* | (2006.01) |
| *C21D 6/00* | (2006.01) |
| *C21D 1/773* | (2006.01) |
| *C21D 1/74* | (2006.01) |
| *C21D 11/00* | (2006.01) |
| *C21D 1/613* | (2006.01) |
| *C21D 1/18* | (2006.01) |

(52) U.S. Cl.
CPC ............ *F16C 33/1025* (2013.01); *C21D 1/18* (2013.01); *C21D 1/613* (2013.01); *C21D 1/74* (2013.01); *C21D 1/773* (2013.01); *C21D 6/00* (2013.01); *C21D 9/40* (2013.01); *C21D 11/00* (2013.01); *C22C 38/001* (2013.01); *F16C 17/02* (2013.01); *C21D 2201/00* (2013.01); *C21D 2211/001* (2013.01); *C21D 2241/00* (2013.01); *F16C 2204/60* (2013.01)

(58) Field of Classification Search
None
See application file for complete search history.

(56) References Cited

FOREIGN PATENT DOCUMENTS

CN 111334702 A * 6/2020

* cited by examiner

*Primary Examiner* — Anthony M Liang
(74) *Attorney, Agent, or Firm* — GARCIA-ZAMOR INTELLECTUAL PROPERTY LAW, LLC; Ruy Garcia-Zamor

(57) ABSTRACT

A bearing assembly, particularly refrigerant lubricated bearing assembly, having at least an inner ring and an outer ring, which are rotatable to each other. At least one bearing ring is made from a nitrogen-alloyed stainless steel having a nitrogen (N) content of more than 0.6 wt.-%. A method for manufacturing such a bearing ring is also provided.

16 Claims, 1 Drawing Sheet

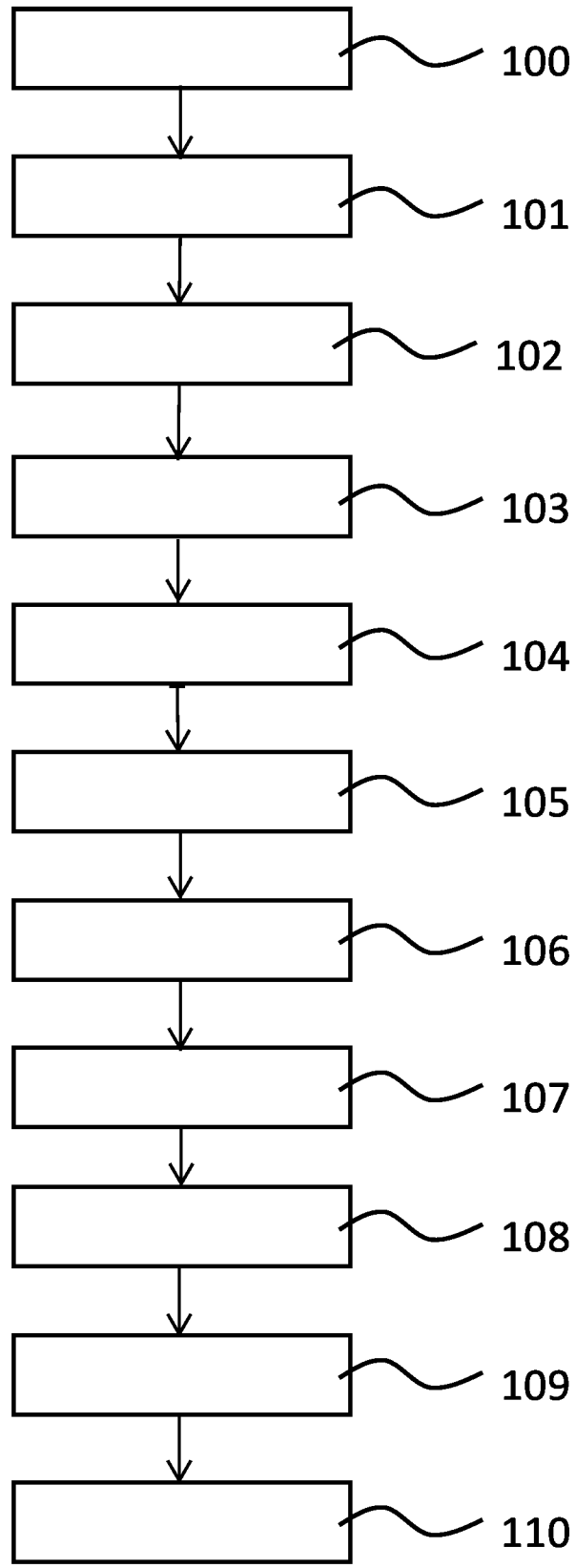

BEARING ASSEMBLY

CROSS-REFERENCE TO RELATED APPLICATIONS

This application claims priority to German Patent Application no. 102020208972.8, filed Jul. 17, 2020, the contents of which is fully incorporated herein by reference.

TECHNICAL FIELD OF THE INVENTION

The present invention relates to a bearing assembly, particularly a refrigerant lubricated bearing assembly.

BACKGROUND OF THE INVENTION

Bearings usually comprise at least a first and a second ring which are made from metal, particularly a bearing steel, and are rotatable to each other. The space between the rings may be filled with a lubricant for reducing friction and increasing the service life. Recently, instead of using "classic" lubrication substances, also other substances, such as refrigerant, have been used as lubricant. Disadvantageously, these substances constitute an aggressive environment, which results in an increased and accelerated corrosion of the bearing components made from conventional bearing steel.

It is therefore object of the present invention to provide a bearing assembly, which has, in aggressive environments, a higher resistance against corrosion.

SUMMARY OF THE INVENTION

In the following a bearing assembly, particularly a refrigerant lubricated bearing assembly, is proposed which comprises at least an inner ring and an outer ring, which are rotatable to each other. For reducing the risk for corrosion, particularly in aggressive environments, at least one bearing ring is made from a nitrogen-alloyed stainless steel having a nitrogen (N) content of more than 0.6 wt.-%.

Usually, the maximum nitrogen content for nitrogen-alloyed stainless bearing steels is chosen to be between 0.4 wt. % and 0.5 wt. % for providing a sufficient toughness. Higher nitrogen contents in such nitrogen-alloyed stainless steels result in a deteriorated ductility and fracture toughness which has to be avoided in bearing assemblies under all circumstances. This is due to the fact that even if nitrogen is known to mitigate corrosion in nitrogen-alloyed stainless steels, it is also known to cause brittleness in excessive concentrations. Brittleness in turn increases the risk for fractures and cracks, which damage the bearings beyond repair. Consequently, a high nitrogen content is not desired in bearing steels. Surprisingly, the inventors have found that, in contrast to the conventional teachings, a nitrogen-alloyed stainless steel with a nitrogen content of more than 0.6 wt. % can be used in bearing assemblies, particularly bearing assemblies operating in aggressive environments, and it is still possible to obtain both reduced corrosion and sufficient bearing steel properties.

Thereby, it is particularly preferred, that the nitrogen content of the nitrogen-alloyed stainless steel is less than 2.0 wt. %. Higher nitrogen contents result in excessive porosity so that the nitrogen-alloyed stainless steel cannot be used in bearing applications any more. Advantageously, the nitrogen content of the nitrogen-alloyed stainless steel used for the bearing assembly is in the range of 0.6 to 2.0 wt. %, preferably between 1.2 to 1.8 wt. %, more preferred between 1.4 to 1.6 wt. %, and most preferred 1.55 wt. %.

According to a further embodiment, a lubricant is encompassed between the inner and outer ring, wherein the lubricant is preferably a refrigerant or a refrigerant containing lubricant. Refrigerant lubricated bearings are often used in compressors of cooling systems, e.g. in chillers or air conditioning systems, and are, for the sake of simplicity, lubricated by the refrigerant used in the cooling system itself. However, the refrigerant often dissociates into harmful substances during service, which increase corrosion. The reason for that is that refrigerants usually used in air conditioning chillers are not stable under all conditions. The molecules can break down and produce by-product compounds which are harmful to the bearings. The breakdown can be caused by heat, pressure, humidity or the presence of liquid contaminants that function as catalysts or by the inherent chemical instability of the refrigerant.

The most damaging by-products are acids, in particular hydrofluoric acid (HF) and hydrochloric acid (HCl), which are very corrosive. HF and HCl are formed by fluorine and chlorine atoms contained in the refrigerant molecules. Of special concern are recently developed refrigerants such as R1234ze, R1233zd and R1234yf, which are formulated to break down easily in case they are leaked into the atmosphere where they can potentially cause environmental problems.

As mentioned above the high nitrogen content in the nitrogen-alloyed stainless steel allows for an increased corrosion protection. Thus, bearings made from nitrogen-alloyed stainless steels having such a high nitrogen content, particularly refrigerant lubricant bearings, have a higher corrosion resistance and a prolonged service life.

According to a further preferred embodiment, the bearing assembly is a rolling bearing, wherein the inner and outer ring define a rolling chamber in which a set of rolling elements is housed. Preferably, the bearing assembly is a hybrid rolling bearing, with bearing rings made from metal whereas the rolling elements are made from ceramic. In such bearings, brittleness is of special concern as the ceramic rolling elements have a higher hardness and stiffness, and therefore a higher impact on the relatively "softer" metal rings, especially during shock loads. An increase in the brittleness of the metal rings e.g. due to the high nitrogen content in the nitrogen-alloyed stainless steels would also lead to an increased risk of damage.

For reducing porosity caused by vacuum heat treatments, and the brittleness induced by increased nitrogen content, at least one component of the bearing assembly is heat treated in a special manner. The heat treatment of the bearing components provides a bearing component which has an optimized microstructure. Due to the special heat treatment the microstructure is enriched with Cr and N for an increased corrosion resistance. Further, the austenite which is a weak phase will be reduced almost completely for increasing strength and hardness and providing a higher dimensional stability of the bearing component. Further, the microstructure may show formation of less chromium-rich precipitates, which would lead to increased corrosion resistance.

For obtaining the desired microstructure, the bearing component is heat treated. The heat treatment usually comprises a heating step and a subsequent quenching step. Advantageously, the heat treated component is further deep-frozen and/or tempered for increasing the quality of the desired microstructure. The treatment will be described in detail below with reference to the inventive method, but it's features applies also to the bearing assembly/component itself, as each treatment step has impact on the microstructure of the bearing component and the final quality and features of the nitrogen-alloyed stainless steel microstructure.

Nevertheless, additionally or alternatively, a bearing assembly is provided, wherein at least one bearing component is quenched, deep-frozen and/or tempered. This also influences the microstructure of the nitrogen-alloyed stainless steel. Thereby, the heating followed by quenching reduces the porosity of the near-surface microstructure, by means of controlling the vacuum or the reduced pressure level and temperature during the applied heat treatment. Gas-quenching, followed by deep-freezing reduces the residual austenite content, resulting in increased strength and hardness, and the subsequent tempering step or steps, the latter may include freezing treatments in between temper steps, results in a microstructure with increased toughness. The tempering stage is designed such that a balance between strength, dimensional stability, toughness and above all corrosion resistance, is obtained.

Consequently, a further aspect of the present invention relates to a method for manufacturing a bearing assembly as mentioned above, wherein the method comprises the following steps:

Providing a bearing component, particularly at least one bearing ring or at least one rolling element, made from a nitrogen-alloyed stainless steel having a nitrogen content of more than 0.4 wt.-%, preferably a nitrogen content between 0.4 to 2.0 wt.-%, preferably between 1.2 to 1.8 wt.-%, more preferred between 1.4 to 1.6 wt.-%, and most preferred 1.55 wt.-%, and Heat treating the at least one bearing component.

As mentioned above the heat treatment of the nitrogen-alloyed stainless steel with the increased nitrogen content has to be adapted so that the nitrogen-alloyed stainless steel with the high nitrogen content can be used in bearing applications. Thereby, it is further preferred that the temperature during the austenitisation heat treatment and/or the holding or soaking time at such a temperature and/or the pressure are balanced for a minimal nitrogen loss. Nitrogen loss during heat treatment is one of the main reasons for the increased near surface porosity of the indicated nitrogen-alloyed stainless steel. The main purpose of the austenitisation step is to obtain austenite in the microstructure, and in particular, to enrich it with Cr and N for increased corrosion resistance.

According to a preferred embodiment of the method, the heat treatment, particularly the heating step, is performed in a nitrogen atmosphere, wherein the partial pressure of the nitrogen is in the range between 0.1 and 0.5 bar, preferably 0.15-0.2 bar. This nitrogen partial pressure ensures that the usual nitrogen content loss during heat treatment in a vacuum chamber which results in the above mentioned porosity may be reduced or negligible.

According to a further preferred embodiment, for a balanced minimal nitrogen loss, the austenitisation temperature is in the range of 1040° C. to 1100° C. Further, it is preferred to determine a holding (soaking time) at the austenitisation temperature to be in the range of 5 to 45 min. The soaking time may be further dependent on the wall thickness of the bearing component, for increasing the quality of the resulting bearing component.

The higher the austenitisation temperature and/or the longer the soaking time at the temperature is, the more elements such as chromium, carbon and nitrogen are dissolved in austenite. This results in a general increase of strength and hardness, for a given quenching and tempering protocol, and therefore for an increased corrosion resistance.

However, on the other hand, a too high austenitisation temperature or a too long soaking time results in difficulties for reducing the content of retained austenite, which in turn negatively impacts the dimensional stability. Further it might lead to a coarser microstructure, which reduces the toughness, a nominally, higher content of near-surface gaseous porosity and/or an increased risk ring ovality/distortion.

Consequently, austenitisation temperature and/or soaking time need to be carefully adapted for providing a bearing component with the desired features.

Besides heating in a vacuum chamber also other heating methods, such as e.g. induction hardening, are possible. Induction hardening has the further advantage that a subsequent quenching and/or tempering step(s) may be performed by the same apparatus as the induction heating.

Further, according to a preferred embodiment, the heat treatment step comprises at least one pre-heating step, wherein the bearing component is pre-heated to the austenitisation temperature, wherein preferably the austenitisation temperature is in the range of 1040° C. to 1100° C., and an austenitisation step, during which the bearing component is held at austenitisation temperature for a pre-determined time, preferably 5 to 45 min. The preheating may preferably be performed in a single or multi step, e.g. double step, with equilibration at each step. Due to the pre-heating step(s) a uniform heating throughout the bearing component may be reached, and distortion during austenitizing may be minimized.

The heating of the bearing component is usually followed by a quenching step for increasing and determining the hardness of the bearing component and for converting the nitrogen-alloyed stainless steel structure from austenite back to martensite.

Preferably, the quenching step is performed by gas quenching, wherein helium or nitrogen or a mixture of helium and nitrogen is used. Due to the lower temperature gas quenching with help of helium is faster, but also more expensive. The gas quenching is preferably performed with a pressure in the range of 4 to 9 bar. The indicated gas quenching allows for a sufficient heat extraction from the parts during quenching which in turn prevents the formation of grain boundary precipitates. Such grain boundary precipitates may weaken the microstructure and reduce corrosion resistance and are therefore to be avoided. On the other hand, a too high gas pressure during quenching may cause quenched components to crack. Thus, also the quenching parameters need to be carefully adapted for providing a bearing component having the desired properties.

Alternatively, an oil quenching, preferably in a temperature range between 40° C. to 80° C. may be performed. The oil or gas quenching serves to transform the austenite, which is a weak phase, into martensite (hard phase).

As mentioned above, the heat treatment may comprise further steps which are performed after the initial heating and quenching step. Consequently, a preferred embodiment of the method further comprises at least one of the following steps:

Deep-freezing, and
Tempering.

Thus, besides the usual hardening by means of heating and subsequent quenching, the bearing component made from a steel with a high nitrogen content may subsequently be deep-frozen. Since the transformation of austenite to martensite during the quenching is an incomplete transformation, that is, for the nitrogen-alloyed stainless steel compositions the subject of this invention, it is preferred to add further treatment steps. Deep-freezing of the bearing component reduces the softness of the nitrogen-alloyed stainless steel as it helps to remove the residual austenite in the nitrogen-alloyed stainless steel structure. This results in higher strength and hardness, as well as a higher dimensional stability of the bearing component.

Preferably, the deep-freezing is performed in a temperature range between −70° C. to −196° C. The holding time at this temperature is preferably between 15 min to 4 h. As the deep-freezing is intended to remove residual austenite it is further preferred that the deep-freezing is performed immediately after quenching.

A further problem with steels having a high nitrogen content is that the nitrogen-alloyed stainless steels have a reduced toughness. For increasing the toughness of the nitrogen-alloyed stainless steel, the inventors have found that at least one, preferably a plurality of tempering steps increase the toughness of the nitrogen-alloyed stainless steel to such an extent that the nitrogen-alloyed stainless steel is usable for bearing applications. Thereby the tempering of the bearing component is preferably performed after the deep-freezing of the bearing component and after the bearing component has reached ambient temperature. Tempering is particularly preferred, as the microstructure of the quenched bearing component comprises martensite which is brittle. So, the tempering process step leads to achieving much higher toughness. Even if hardness might, but not always, drop as a result, the dimensional stability improves greatly. Also, during tempering, the temperature and the soaking time need to be optimized as a too high a tempering temperature may lead to the formation of chromium-rich precipitates, and eventually a reduced corrosion resistance.

Preferably the tempering is performed at temperatures between 160° C. to 600° C. The holding time at this temperature is preferably in the range of 30 min to 4 h.

According to a further preferred embodiment, the tempering is a multi-step tempering, wherein e.g. in a first tempering step, the bearing component is heated to a temperature in the range of 160° C. to 240° C., and in at least one further tempering step the bearing component is heated to a higher temperature as in the previous tempering step, preferably between 470° C. to 550°, and wherein the bearing component is cooled down to ambient temperatures after each tempering step. Preferably, intermediate freezing step (s) may be performed between the tempering steps.

Further preferred embodiments are defined in the dependent claims as well as in the description and the figures. Thereby, elements described or shown in combination with other elements may be present alone or in combination with other elements without departing from the scope of protection.

BRIEF DESCRIPTION OF THE DRAWINGS

In the following, preferred embodiments of the invention are described in relation to the drawings, wherein the drawings are exemplarily only, and are not intended to limit the scope of protection. The scope of protection is defined by the accompanied claims, only.

The FIGURE shows:
FIG. 1: a flow diagram of a preferred embodiment of a method for manufacturing a bearing component according to the present invention.

In the following same or similar functioning elements are indicated with the same reference numerals.

DETAILED DESCRIPTION OF THE INVENTION

FIG. 1 is a flow diagram depicting preferred steps of a preferred embodiment of a method for manufacturing a bearing assembly or a bearing component, wherein at least one component of the bearing assembly is made from a nitrogen-alloyed stainless steel having a nitrogen content which is higher than 0.6 wt. %. Such a nitrogen-alloyed stainless steel is preferably used in bearing assemblies which operate in aggressive environments, e.g. in refrigerant lubricated bearings.

Recently, not only "classic" lubricants, such as grease or oil, have been used as lubricants for bearings, but also substances already present in the bearing assembly may be used. One of the main applications in this area are refrigerant lubricated bearings which are used in in compressors of cooling systems, e.g. in chillers or air condition systems, and are, for the sake of simplicity, lubricated by the refrigerant used in the cooling system itself. However, the refrigerant often contains harmful substances which increase corrosion. The reason for that is that refrigerants usually used in air conditioning chillers are not stable under all conditions. The molecules can break down and produce by-product compounds which are harmful to the bearings. The breakdown can be caused by heat, pressure or the presence of liquid contaminants that functions as catalysts or by the inherent chemical instability of the refrigerant.

The most damaging by-products are acids, in particular hydrofluoric acid (HF) and hydrochloric acid (HCl), which are very corrosive. HF and HCl are formed by fluorine and chlorine atoms contained in the refrigerant molecules. Of special concern are recently developed refrigerants such as R1234ze, R1233zd and R1234yf, which are formulated to break down easily in case they are leaked into the atmosphere where they can potentially cause environmental problems.

The nitrogen-alloyed stainless steel having a high nitrogen content of more than 0.6 wt. %, reduces the risk for corrosion, but has to be treated in a special way for providing both a high corrosion resistance as well as sufficient microstructural features for being useable in a bearing assembly at all. The reason for that is that the nitrogen content in the nitrogen-alloyed stainless steel does not only increase the corrosion resistance but also the brittleness of the component which has to be avoided in bearing assemblies under all circumstances.

Additionally, in the above mentioned applications in refrigerant lubricated bearings, often so called hybrid bearings are used, wherein the bearing rings are made from metal whereas the rolling elements are made from ceramic. In such bearings, brittleness is of special concern as the ceramic rolling elements have a higher hardness and therefore a higher impact on the "softer" metal rings. An increase brittleness of the metal rings e.g. due to the high nitrogen content in the nitrogen-alloyed stainless steels would also lead to an increased risk for damage.

For reducing the brittleness in general, and further to addressing the main disadvantages of the nitrogen-alloyed stainless steel having a high nitrogen content, namely porosity, softness and reduced toughness, the bearing component made form a nitrogen-alloyed stainless steel having a very high nitrogen content is subjected to a special heat treatment. In the following, a preferred embodiment of such an inventive heat treatment will be described with reference to FIG. 1. In general, the preferred heat treatment comprises a heating step, a subsequent quenching step, for reducing the porosity, followed by a deep-freezing step for reducing the softness and a final tempering step for increasing the toughness.

To the main steps in detail.

After having provided in step 100 a bearing component, particularly at least one bearing ring or at least one rolling element, made from a nitrogen-alloyed stainless steel having a nitrogen N content of more than 0.4 wt.-%, preferably a nitrogen content between 0.4 to 2.0 wt.-%, preferably between 1.2 to 1.8 wt.-%, more preferred between 1.4 to 1.6 wt.-%, and most preferred 1.55 wt.-%, the bearing component is transferred to a vacuum chamber for the heat treatment (step 101). Alternatively, also other heat treatment methods, as for example an induction hardening apparatus, may be used.

In the described preferred embodiment of the heat treatment, the vacuum chamber is filled with a nitrogen atmosphere, wherein a gas pressure of the nitrogen is in the range between 0.1 and 0.5 bar, preferably 0.2 bar. The nitrogen content ensures that the usual nitrogen content loss during heat treatment in a vacuum chamber, which results in the above mentioned porosity, may be reduced. In the vacuum chamber, the heating step comprises a pre-heating step 102, during which the bearing component is pre-heated to austenitisation temperature, wherein the austenitisation temperature is in the range of 1040° C. to 1100° C.

The preheating may be performed in a single step or by multi steps (double steps) with equilibration at each step.

The pre-heating step 102 is followed by a so-called austenitisation step 103, during which the bearing component is held at the austenitisation temperature for a predetermined time, preferably 5 to 45 min During the heating steps 102, and 103, the nitrogen-alloyed stainless steel structure is converted from being predominantly ferritic to mostly austenite.

Once, the bearing component has reached the required temperature, and the specified time (soaking time) has passed, the bearing component is quenched (step 104), immediately. Preferably, the quenching step 104 is performed by gas quenching, wherein helium or nitrogen or a mixture of helium and nitrogen is used. The gas quenching is preferably performed at a pressure in the range of 4 to 9 bar. During the quenching step, the nitrogen-alloyed stainless steel microstructure matrix is converted from austenite to mostly martensite. Before the component is removed from the quenching device, it is preferred that component's temperature is below 65-50° C.

For removing the residual austenite structure, and for reducing the softness of the bearing component made from the high nitrogen content nitrogen-alloyed stainless steel, the bearing component is subsequently subjected a deep-freezing step 105. Preferably, the deep-freezing step 105 is performed in a temperature range between −70° C. to −196° C. The holding time at this temperature is preferably between 15 min to 4 h. As the deep-freezing is intended to remove residual austenite it is further preferred that the deep-freezing is performed immediately after the quenching.

Optionally, after the deep-freezing step, the bearing component is brought to ambient temperature (step 106), or at least to temperatures below 40° C. This may be done passively by leaving the component at ambient temperature, or actively by subsequent optional tempering step(s). Alternatively, the step 106 is left out and the bearing component is subjected to the tempering steps (see below), directly after the deep freezing step 105.

Finally, for increasing the toughness of the steel, the bearing component is subject to a tempering step, preferably a plurality of tempering steps (steps 107 to 109), which increase the toughness of the nitrogen-alloyed stainless steel to such an extent that the nitrogen-alloyed stainless steel is usable for bearing applications.

As mentioned above, the tempering is a multi-step tempering, wherein e.g. in a first tempering step 107, the bearing component is heated to a temperature in the range of 160° C. to 240° C., and held at the temperature for 30 min to 4 h. After the first tempering step, the bearing component is brought back to ambient temperature, or at least, preferably passively, to temperatures below 40° C., in step 108. Optionally, the bearing component might be subjected to (deep-)freezing to temperatures between −70° C. to −196° C. After having reached ambient temperature, the bearing component is heated again, in a second tempering step 109, wherein the bearing component is heated to a higher temperature, preferably between 470° C. to 550°, and held at the temperature for 30 min to 4 h, again. After the second heating step 109, the bearing component is cooled to ambient temperature, or at least, preferably passively, to temperatures below 40° C., in step 110.

Dependent on the combination of mechanical, dimensional stability and corrosion resistance properties of the bearing component, also more or less than two tempering steps are possible.

In summary, due to the above described inventive heat treatment of the bearing component, it has become possible to use high nitrogen content nitrogen-alloyed stainless steel for bearing applications. Consequently, is has become possible to obtain both increased corrosion resistance and desired mechanical properties for bearing components in very aggressive environments, such as refrigerant lubricated bearings.

REFERENCE NUMERALS

100 providing bearing component made from nitrogen-alloyed stainless steel with a nitrogen content between 0.6 wt. % and 2.0 w.t %
101 transferring the bearing component to heat treatment
102 pre-heating the bearing component to the austenitisation temperature in a single or double step, with equilibration at each step
103 austenitisation of the bearing component once it has reached the required temperature, and for a specified time (soaking time)
104 gas-quenching of the bearing component
105 deep-freezing of the bearing component
106 bringing the bearing component to ambient temperature
107 first tempering step—heating the bearing component to first temperature
108 bringing the bearing component to ambient temperature or at least to temperatures below 40° C.
109 second tempering step—heating the bearing component to second temperature
110 bringing the bearing component back to ambient temperature

The invention claimed is:
1. A method for manufacturing a bearing assembly comprising:
providing a bearing component, comprising at least one bearing ring or at least one rolling element, made from a nitrogen-alloyed stainless steel having a nitrogen N content between 1.2 to 1.8 wt. %;
heat treating the bearing component.

2. A method for manufacturing a bearing assembly comprising:
providing a bearing component, comprising at least one bearing ring or at least one rolling element, made from a nitrogen-alloyed stainless steel having a nitrogen N content between 0.4 to 2.0 wt. %;
heat treating the bearing component
providing a bearing component, particularly at least one bearing ring or at least one rolling element, made from a nitrogen-alloyed stainless steel having a nitrogen N content wherein the heat treatment comprises a heating step, wherein the heating step is performed in a nitrogen atmosphere, wherein a gas pressure of the nitrogen is in a range between 0.1 and 0.5 bar.

3. The method according to claim 2, wherein the heating step of the heat treatment comprises at least one pre-heating step, wherein the bearing component is pre-heated to austenitisation temperature, and wherein the austenitisation temperature range of 1040° C. to 1100° C., and an austenitisation step, during which the bearing component is held at austenitisation temperature for a pre-determined time of between 5 to 45 min.

4. A method for manufacturing a bearing assembly comprising:
providing a bearing component, comprising at least one bearing ring or at least one rolling element, made from a nitrogen-alloyed stainless steel having a nitrogen N content between 0.4 to 2.0 wt. %;
a heat treatment that comprises heat treating the bearing component;
wherein the heat treatment further comprises a quenching step, and wherein the quenching of the bearing component is performed by gas quenching with helium He or nitrogen N, at a pressure in a range of 4 to 9 bar.

5. The method according to claim 1, wherein the heat treatment further comprises a deep-freezing step of the bearing assembly, performed after a quenching step, and wherein the deep-freezing step is performed in a temperature range between −70° C. to −196° C.

6. The method according to claim 1, wherein the heat treatment further comprises a tempering step of the bearing component, performed after the bearing assembly has reached ambient temperature, wherein the tempering comprises a single step tempering or a multi-step tempering, during which the bearing component is heated to a temperature range of 160° C. to 600° C.

7. A method for manufacturing a bearing assembly comprising:
providing a bearing component, comprising at least one bearing ring or at least one rolling element, made from a nitrogen-alloyed stainless steel having a nitrogen N content between 0.4 to 2.0 wt. %;
a heat treatment that comprises heat treating the bearing component;
wherein the heat treatment further comprises a tempering step of the bearing component, performed after the bearing assembly has reached ambient temperature, wherein the tempering comprises at least a single step tempering or a multi-step tempering, during which the bearing component is heated to a temperature range of 160° C. to 600° C.;
wherein the tempering step is a multi-step tempering, wherein in a first tempering step the bearing component is heated to a temperature range of 160° C. to 240° C., and in at least one further tempering step the bearing component is heated to a higher temperature than the first tempering step, between 470° C. to 550° C., wherein the bearing component is cooled down to ambient temperatures after each tempering step.

8. The method according to claim 1, wherein the nitrogen N content is between 1.4 to 1.6 wt. %.

9. The method according to claim 2, wherein the gas pressure of the nitrogen is 0.2 bar and the nitrogen content is 1.55 wt. %.

10. The method according to claim 2, wherein the nitrogen N content is between 1.2 to 1.8 wt. %.

11. The method according to claim 4, wherein the nitrogen N content is between 1.2 to 1.8 wt. %.

12. The method according to claim 4, wherein the nitrogen content is 1.55 wt. %.

13. The method according to claim 5, wherein the deep-freezing step is performed for 15 minutes to 4 hours.

14. The method according to claim 6, wherein the tempering step occurs for 30 minutes to 4 hours.

15. The method according to claim 7, wherein the nitrogen N content is between 1.2 to 1.8 wt. %.

16. The method according to claim 7, wherein the nitrogen content is 1.55 wt. %.

* * * * *